F. W. & T. B. SUMNER.
Straw Carrier.

No. 229,649.  Patented July 6, 1880.

Attest.
Sidney P. Hollingsworth
William W. Dodge.

Inventor:
F. W. Sumner
T. B. Sumner
By Dodger&N
Attys.

UNITED STATES PATENT OFFICE.

FREDERICK W. SUMNER AND THOMAS B. SUMNER, OF HUTCHINSON, MINN.

STRAW-CARRIER.

SPECIFICATION forming part of Letters Patent No. 229,649, dated July 6, 1880.

Application filed February 9, 1880.

*To all whom it may concern:*

Be it known that we, FREDERICK W. SUMNER and THOMAS B. SUMNER, of Hutchinson, in the county of McLeod and State of Minnesota, have invented certain Improvements in Straw-Carriers, of which the following is a specification.

Our invention relates to that class of straw-carriers for thrashing-machines in which a slotted bed or platform is mounted on crank-shafts and given a longitudinal and vertical movement thereby.

The invention consists in a peculiar arrangement of beaters in connection with said bed, whereby the straw is more perfectly loosened up and separated and any loose grain contained therein permitted to fall out.

Figure 1:
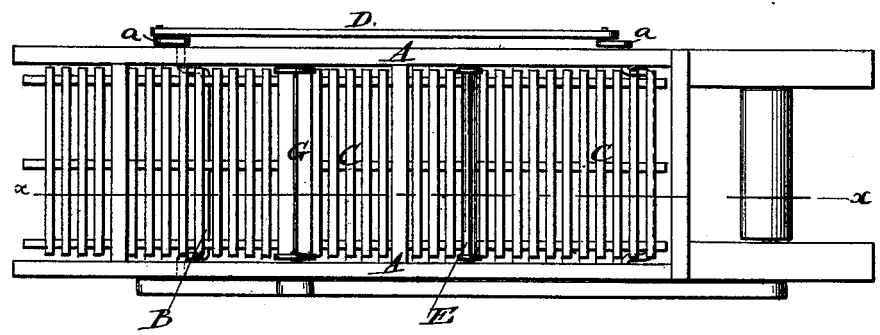
Figure 2:
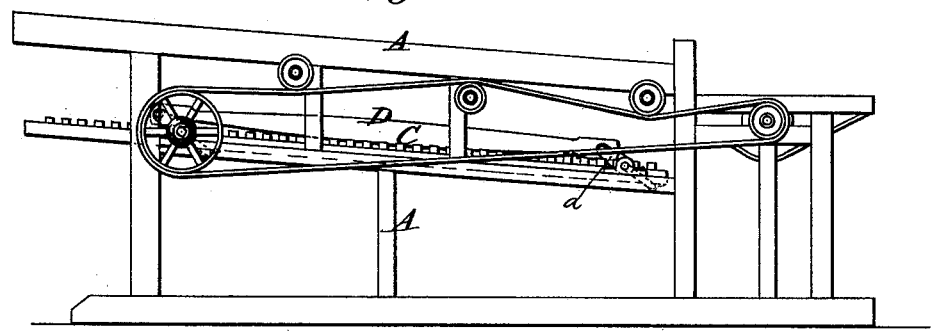
Figure 3:
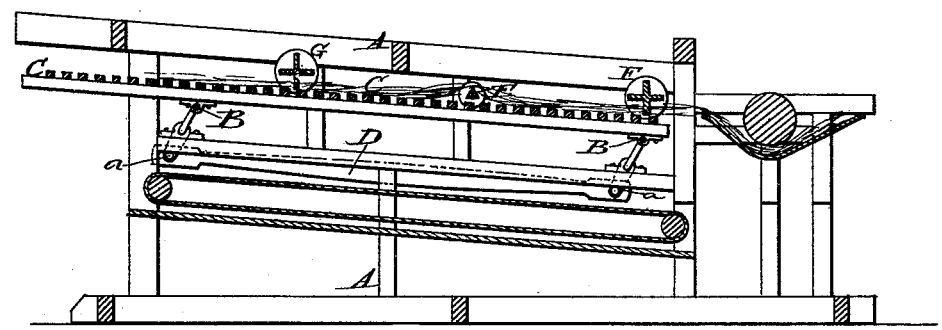
Figure 4:
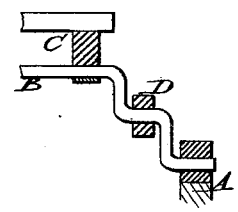

In the accompanying drawings, Figure 1 represents a top-plan view of our improved machine; Fig. 2, a side elevation of the same, and Fig. 3 a vertical longitudinal section.

Straw-carriers have been for many years made with a bed or platform composed of narrow slats and mounted upon crank-shafts in order that a rising and falling action might be imparted to the bed by the rotation of the shafts, and more recently the rolling-heads or cranks have been furnished with counter-weights to cause the steady and regular movement of the platform or bed. Such machines as heretofore constructed have not been as efficient or satisfactory in their operation as they are susceptible of being made when constructed upon this principle, first, because the cranks or rolling-heads, being independent of each other at opposite ends of the platform or only connected by belts, permitted the rotation of one shaft to occur with merely an oscillation of the other—an event liable to occur either through the slipping of the belt or by reason of greater weight upon the platform at one end than at the other—difficulties not overcome by the weighting or counterbalancing of the rolling-heads as heretofore effected. Another cause of inefficient action has been the inadequate loosening or separation of the straw in passing through the carrier.

To remedy the above difficulties is the object of our invention; and to this end it consists in connecting the crank-shafts by means of a pitman placed on the opposite side of the center of the shafts from that of the bed or platform and giving to said pitman a weight corresponding to that of the bed; in mounting across the frame of the machine, near the receiving end, and just above the highest level attained by the bed or platform, a rotary bar or agitator, preferably of triangular form in cross-section, over which the straw passes, and by which it is loosened and separated; and, lastly, in combining with the machine above described a rotary beater to act upon the straw after it has passed over the agitator or feeder.

Referring now to the drawings, A represents a strong wooden frame of the usual construction, in which are mounted, at proper distance apart, two transverse crank-shafts, B B, supported in suitable bearings, as shown.

C represents a bed or platform having a slatted face, and preferably disposed in a slightly-inclined position, said bed or platform being furnished on its under side with boxes or bearings, through which pass the shafts B B. At one end each of the shafts B is formed or provided with a second crank, $a$, bent or extended on the opposite side of the center of the shaft from that on which the platform or bed C is attached, this second cranked portion extending in each case beyond the side of the frame, as in Fig. 1.

D represents a pitman or connecting-rod extending from one of the cranks $a$ to the other, and serving to maintain said cranks always in the same position relative to each other, and acting, in connection with the frame or stringers of the bed or platform, to maintain said platform at all times in the same plane relative to the horizon. The connecting-bar or pitman D is made of a weight corresponding to that of the bed or platform C, and thus, while serving to maintain the latter in proper position and to cause a simultaneous and equal movement of both ends of the same, serves also as a counter-balance thereto, preventing any jarring or jolting of the machine when in action.

In order that the straw may be well loosened up and separated one straw from another, in order to permit the loose kernels of grain held by it to fall out, a revolving bar or agitator, E, preferably of triangular form in cross-section, is extended transversely across the machine, mounted in suitable bearings in the frame, and provided with a driving-pulley, as shown. This bar or agitator E is placed near the receiving end of the bed or platform and just above the highest level reached by the same in rising.

The straw, in passing from the thrashing-machine, first travels under a rotary beater, F, which keeps the straw straight and directs it properly, and then falls upon the bar E, which, having flat faces and being rapidly rotated, shakes the straw lightly but quickly, and is very effectual in its office of loosening and separating the straws. The straw thus loosened and separated is advanced by the movement of the platform and passes beneath a second rapidly-revolving beater, G, which whips the straw and shakes out the loose grain or kernels. The bar or agitator E and the beaters F G also assist in advancing and prevent the backward movement of the straw.

It is obvious that in case the jolting action of the bed or platform is desired the pitman or connecting rod may be made much lighter than otherwise, and may, if desired, be placed on the same side of the centers of the shafts as the bed or platform, but at a different distance therefrom. The arrangement shown and described is, however, ordinarily preferred. It is likewise apparent that two connecting-rods or pitmen may be employed, one at each side of the machine, and that the weight may be divided between them.

An endless belt or grain-board, either or both, will be placed below the slatted bed to receive the grain falling through the same and conduct it to a proper receptacle. Power will be applied, by pulley or otherwise, to one of the crank-shafts, and parts of the machine not herein described will be of ordinary construction.

Having thus described our invention, what we claim is—

1. In combination with a slatted bed or platform having a vertical and longitudinal movement, the rotary beater E, arranged as shown and described, so that the straw is caused to pass over its top.

2. In combination with a platform or bed having the vertical and longitudinal movements, the transverse rotary beater E, journaled in the frame, and of triangular form in cross-section, arranged to operate beneath the grain.

3. In combination with a bed or platform having a longitudinal and vertical movement, as described, two rotary beaters, arranged to act upon the top of the straw, and an intermediate rotary beater or agitator, arranged to act beneath the straw and to urge the same toward the head of the platform.

FREDERICK W. SUMNER.
THOMAS B. SUMNER.

Witnesses:
JOHN MERSEN,
DAVID A. ADAMS.